Jan. 29, 1929. 1,700,151
C. W. ALBRECHT
SETTING HEAD FOR SAWMILL LOG CARRIAGES
Filed Aug. 31, 1925  2 Sheets-Sheet 1

Inventor
Charles W. Albrecht
Attys.

Jan. 29, 1929.　　　　　　　　　　　　　　　　　　1,700,151
C. W. ALBRECHT
SETTING HEAD FOR SAWMILL LOG CARRIAGES
Filed Aug. 31, 1925　　　2 Sheets-Sheet 2
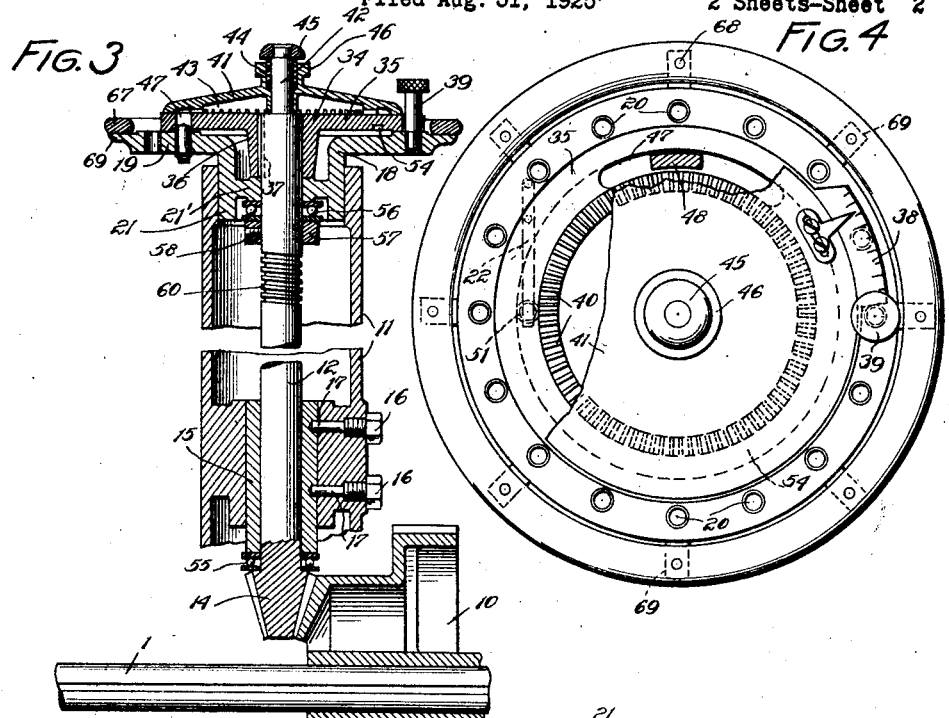
Inventor
Charles W. Albrecht
Attys.

Patented Jan. 29, 1929.

1,700,151

UNITED STATES PATENT OFFICE.

CHARLES W. ALBRECHT, OF MENOMINEE, MICHIGAN, ASSIGNOR TO THE PRESCOTT COMPANY, OF MENOMINEE, MICHIGAN, A CORPORATION OF MICHIGAN.

SETTING HEAD FOR SAWMILL LOG CARRIAGES.

Application filed August 31, 1925. Serial No. 53,474.

This invention relates to improvements in setting heads for sawmill log carriages, and more particularly to means for increasing the fineness of adjustment of the same.

Sawmill log carriages are provided with some form of setworks mechanism for effecting movement of the dogs and the log held thereby a desired distance transversely of the log carriage for making the next cut, this distance being determined by means of a setting head associated and connected with the setworks mechanism and which is adjusted by the setter to limit the forward or transverse movement of the knees to the amount required for making the next cut, which amount is equal to the thickness of the next board to be cut plus the saw kerf. The accuracy with which the log is cut depends, therefore, upon the accuracy and fineness of adjustment of the setting head. While setting heads constructed heretofore have been designed to control movement of the setworks mechanism to within a fraction of an inch, they have not sufficient fineness of adjustment to control the setworks mechanism to within the smallest fraction of an inch to which it is desired to work in present day sawmill practice to enable the sawyer to cut the boards exactly in accordance with specifications and to reduce the amount of waste to a minimum. One of the objects of the present invention, therefore, is to provide an improved setting head of the character referred to which is adapted to control the setworks mechanism to within the smallest fraction of an inch called for in present day sawmill practice.

Another object is to provide an improved setting head of the character referred to which is simple in construction, easily adjusted or set and which has greater fineness of adjustment than setting heads constructed heretofore.

Other objects and advantages will hereinafter appear.

For the purpose of illustrating the invention an embodiment thereof is shown in the drawings, in which:

Figure 3 is a diagrammatic sectional view, showing the manner in which the setting head may be connected to the set shaft and the setworks mechanism;

Fig. 4 is a plan view of the setting head, partly broken away;

Fig. 5 is an enlarged section on line 5—5 of Fig. 1;

Fig. 6 is a view similar to Fig. 4, showing the relative position of the parts comprising the setting head after the same has been set or adjusted for making the next cut; and Fig. 7 is an enlarged section on line 7—7 of Fig. 6.

Figure 1:
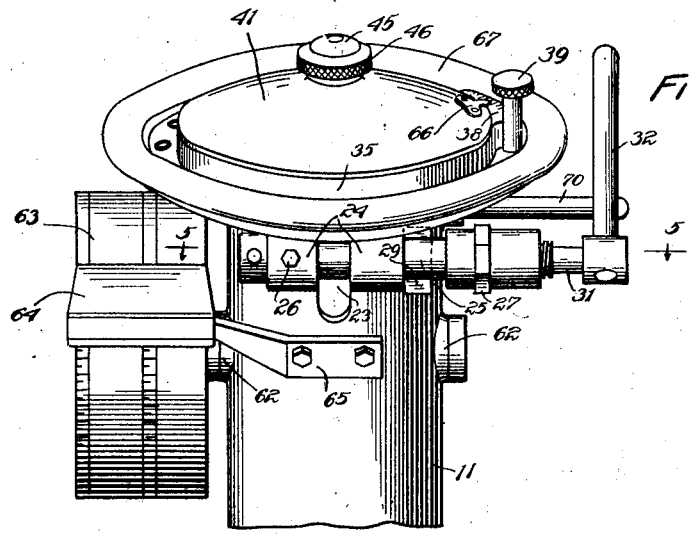
Figure 1 is a front elevation, looking toward the right in Fig. 2.
Figure 2:
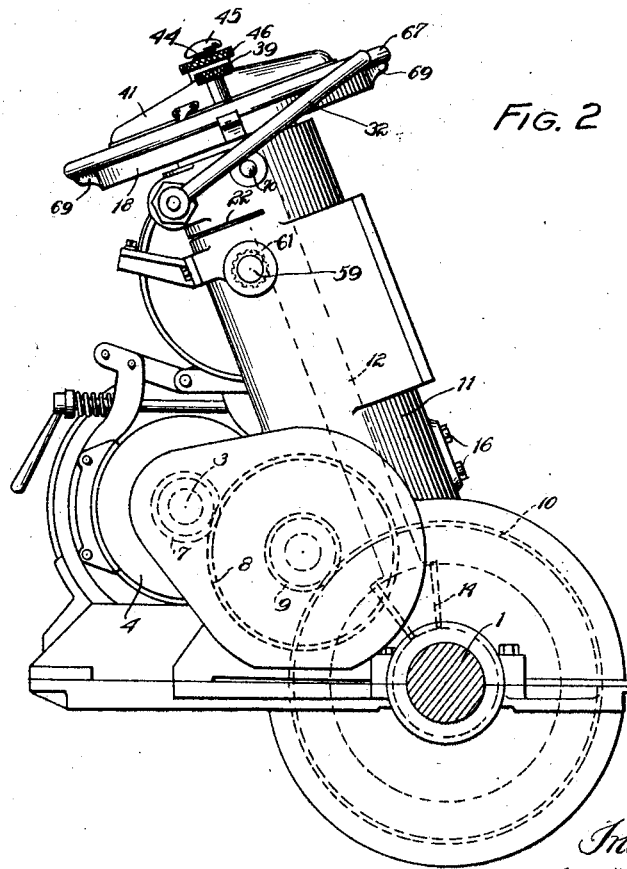
Fig. 2 is a side elevation.

The set shaft 1 is arranged longitudinally of the log carriage in the usual manner and is connected to the knees by means of pinions fixed to the shaft and arranged in mesh with racks on the undersides of the knees or by any other suitable means such as a screw and nut mechanism. The setworks mechanism may comprise a driving shaft 2 connected to a suitable motor mounted on the log carriage, a driven shaft 3 connected and disconnected to and from the driving shaft by means of a suitable friction clutch, designated generally by reference numeral 4, and which is controlled by a member 5 loosely mounted on a shaft 6, member 5 being actuated by a suitable lever or pedal. The driven shaft 3 may be connected to set shaft 1 by means of gears 7, 8, 9 and 10 arranged within the pedestal or stand 11 for the setting head and connected to the vertical shaft 12 by means of a bevel gear 13 which may be formed integrally with gear 10 and a similar bevel gear 14 at the lower end of shaft 12. Shaft 12 may be journaled in a bushing 15 fitted within pedestal 11, as shown in Fig. 3, and held in position by means of bolts 16 screwed into the pedestal and provided with reduced ends 17 extending part way into bushing 15. A member 18 comprises a plate or flange 19 provided with spaced openings 20 arranged concentric to the axis of rotation of shaft 12 and a hub 21 fitted loosely into the upper end of pedestal 11 and provided with a bearing 21' for the upper end of shaft 12. The upper end of pedestal 11 is split at 22 and 23 and is provided with lugs 24 through which a bolt 25 loosely passes, the bolt being held against rotation by means of a second bolt 26 screwed into one of the lugs 24. Bolt 25 is threaded at one end thereof to receive one end of a collar 27 and is provided with a transverse slot 28 through which a key 29 passes. A pin 30 fits loosely in an axial bore in the end of bolt 25 and engages key 29, as shown, the pin being forced to the left, as viewed in Fig. 5, upon rotation of a screw 31 which is threaded into the other end of collar 27 and which engages pin 30, a suitable lever 32 being fixed to screw 31 to cause rotation thereof. Upon downward movement of lever 32, as viewed in Fig. 2, screw 31 will be screwed into collar 27 and force pin 30 and key 29 engaged thereby toward the head 33 of bolt 25 whereby lugs 24 are drawn together and the upper end of pedestal 11 clamped firmly about hub 21 of member 18 to hold the latter against rotary movement with respect to shaft 12. Upon raising of lever 32, lugs 24 will be permitted to move away from each other to release member 18 and permit rotation thereof with respect to pedestal 11, for the purpose hereinafter explained. A second member 34 comprises a flange or plate 35 and a hub 36 extending into hub 21 of member 18 and fixed to shaft 12 by means of keys 37. The flange 35 of member 34 is provided at the edge thereof with a graduated stop or lug 38 arranged to engage or coact with a setting pin 39 placed in any one of the openings 20 in member 18. The upper face of flange 35 of member 34 is provided with teeth 40 spaced closely together and arranged concentric with the axis of rotation of shaft 12, a micrometric or fine-adjustment dial 41 being loosely arranged upon the upper reduced end 42 of shaft 12 and provided with teeth 43 similar to and arranged to mesh with teeth 40 of member 34 whereby dial 41 and member 34 are interlocked or fixed against relative rotary movement with respect to each other. A spring 44 is arranged upon the reduced end 42 of shaft 12 and between a cap 45 fixed thereto and dial 41, to hold the latter in interlocking engagement with member 34. Cap 45 is spaced from the knob or portion 46 of dial 41 to permit vertical movement of the latter a sufficient amount to disengage teeth 43 from teeth 40 to permit rotary movement of dial 41 with respect to member 34 for the purpose hereinafter explained. Flange 35 of member 34 is provided with a slot 47 concentric to shaft 12 and adapted to receive a downwardly extending lug 48 formed on the underside of dial 41 and having a sloping cam face 49 and a vertical face 50 arranged to engage a pin 51 extending upwardly through a suitable opening in flange 19 of member 18 and held in position by means of a spring 52 secured to the underside of flange 19 by means of screws 53. Flange 35 of member 34 is provided on the underside thereof with an annular groove 54 concentric with shaft 12 and adapted to receive the upper end of pin 51 to permit relative rotary movement of members 18 and 34 with respect to each other.

A suitable thrust bearing 55 may be arranged upon shaft 12 between gear 14 and bushing 15 and a similar thrust bearing 56 may also be arranged upon the shaft between bearing 21' and a collar 57 fixed to the shaft by means of a set screw 58.

A shaft 59 may extend through pedestal 11 and be arranged at right angles to shaft 12 and rotated thereby by means of screw threads 60 formed on the shaft and a worm wheel 61 arranged in mesh with screw threads 60 and fixed to shaft 59, the latter being journaled in suitable bearings 62 which may be cast integrally with pedestal 11. A graduated drum 63 is fixed to one end of shaft 59 for rotation therewith and a suitable indicating member 64 is fixed to pedestal 11 by means of a bracket 65, member 64 being arranged in close relation to the graduated surface of drum 63 whereby the sawyer can determine the amount of forward and backward movements of the dogs by the setworks mechanism by observing the relative movement of the graduated drum 63 with respect to the fixed indicating member 64.

A pointer 66 is fixed to dial 41 and arranged to travel over the graduated stop or lug 38 upon relative rotary movement of the dial with respect to member 34.

An annular handle 67 may be secured to member 18 for rotating the same by means of screws 68 passing upwardly through lugs 69 formed integrally with flange 19 of member 18 and screwed into handle 67.

A stop 70 may be fixed in pedestal 11 and arranged to limit downward movement of lever 32 when the latter has reached a position to securely clamp member 18 against rotation with respect to shaft 12.

The operation of the improved setting head is as follows:

Assuming that the parts are in their respective positions as shown in Fig. 4, the setter makes the next setting by raising lever 32 to permit rotation of member 18 with respect to pedestal 11 and by then grasping handle 67 and rotating member 18 in a clockwise direction until pin 51, sometimes referred to as the starting pin, engages the vertical face 50 of lug 48, as shown in Fig. 6, lug 48 being held against rotation with respect to shaft 12 by means of the interlocking engagement of teeth 43 of dial 41 with teeth 40 of member 34, which latter member is fixed to shaft 12 by means of keys 37. Engagement of lug 48 with starting pin 51 represents zero setting as far as the next cut is concerned, the difference between the readings of the graduated drum or dial 63 at this time and that after the next setting movement of shaft 1 has been made equalling in amount the thickness of the next board to be cut. By leaving the setting pin 39 in the same opening 20 into which it was inserted in making the last setting and by rotating member 18 to the position thereof shown in Fig. 6, the same setting will be made as was made before. Should the setter desire to cut a board of greater thickness than that cut before, however, he would place the setting pin 39 in one of the other openings 20 further removed in a clockwise direction from stop 38, while if he should desire to cut a thinner board, he would insert pin 39 into one of the three openings shown between the latter and stop 38. After member 18 has been rotated to the position thereof shown in Fig. 6, lever 32 is forced downwardly against stop 70 to clamp the upper end of pedestal 11 about hub 21 of member 18 to hold the latter against rotary movement. Clutch 4 is then applied to connect the driven shaft 3 to driving shaft 2 and cause rotation of set shaft 1 to move the dogs and log held thereby forward. Shaft 12 will also be rotated as well as member 34 keyed thereto until stop 38 reaches the position thereof shown in dotted lines in Fig. 6 and engages setting pin 39. Upon this engagement or coaction of stop 38 with the setting pin 39, which is held against rotary movement, member 34, shaft 12, set shaft 1 and driven shaft 3, which are all connected for movement together as explained above, will be locked against further movement and the dogs and log held thereby will have been moved forward the desired distance for making the next cut. The friction clutch 4 will then slip completely until the operator releases the same to disconnect the driven shaft 3 from driving shaft 2.

From the foregoing it will be seen that by changing the position of setting pin 39 by one or more of the openings 20, the sawyer may change the setting an amount as small as that represented by the distance between adjacent openings 20 which may be as small as one quarter of an inch. Should the sawyer desire to make a setting within a smaller fraction of an inch, he would grasp knob 46 of dial 41 and raise the latter vertically against the action of spring 44 out of interlocking engagement with member 34, and then rotate dial 41 in either direction with respect to member 34 until he has increased or decreased the setting the desired fractional part represented by the distance between adjacent openings 20, this fractional part being shown by the movement of pointer 66 over the graduated stop or lug 38. Upon release of knob 46 the dial will be returned by spring 44 to interlocking engagement with member 34.

If it should be desired to advance the dogs a greater distance than would be permitted by one complete revolution of shaft 12, pin 39 is removed and is replaced after the desired number of complete revolutions of shaft 12 have been made, the sloping or cam face 49 of lug 48 engaging pin 51 and forcing the same downwardly to permit this relative movement of member 34 and dial 41 with respect to member 18 for more than one complete revolution.

When it is desired to recede the knees to take a new log, lever 32 is raised to release hub 21 of member 18 from clamping engagement with the upper end of pedestal 11, as explained above, and driving shaft 2 reversed to reverse the rotation of set shaft 1, shaft 12 and dial 41 and member 34 fixed for rotation with the latter. Upon engagement of the vertical face 50 of lug 48 with pin 51, member 18 will rotate with dial 41 and member 34.

For the purpose of illustrating the manner in which the improved setting head may be connected with setworks mechanism of any of the various types now in use, part of a setworks mechanism has been shown and described. The particular type of setworks mechanism shown is described in detail and claimed in co-pending application Serial No. 49,172, filed August 10, 1925.

From the foregoing it will be seen that an improved setting head for sawmill log carriages has been provided which is simple in construction, which is easily adjusted or set, and which has sufficient fineness of adjustment to meet the requirements of present day sawmill practice.

A preferred embodiment of the invention has been shown and described, but of course various changes in the size, shape and arrangement of the parts may be adopted without departing from the spirit of the invention or the scope of the claims.

The invention claimed is:

1. In a setting head of the character described, the combination with a rotatable shaft, a member arranged for rotation about the axis of rotation of said shaft relatively with respect to the latter and provided with a plurality of spaced openings, means for holding said member against rotation, a second member fixed for rotation with said shaft and arranged adjacent to said first-mentioned member, and a pin adapted for insertion into said openings, said second member being adapted to coact with said pin whereby relative rotary movement of said members with respect to each other is limited in accordance with the selected opening into which said pin is inserted, of means for varying the relative position of said pin and said second member whereby rotary movement of said members with respect to each other may be limited to fractions of the space between adjacent openings in said first-mentioned member.

2. In a setting head of the character described, the combination with a rotatable shaft, a member arranged for rotation about the axis of rotation of said shaft and provided with a plurality of spaced openings, means for holding said member against rotation, a second member fixed for rotation with said shaft and arranged adjacent to said first-mentioned member, and a pin adapted for insertion into said openings, said second member being adapted to coact with said pin whereby relative rotary movement of said members with respect to each other is limited in accordance with the selected opening into which said pin is inserted, of means for varying the relative position of said pin and said second member whereby rotary movement of said members with respect to each other may be limited to fractions of the space between adjacent openings in said first-mentioned member, said last-mentioned means comprising a dial loosely arranged on said shaft and adapted for adjustment with respect to said second member, said dial and said first-mentioned member being provided with means for limiting relative rotary movement of the same with respect to each other in one direction.

3. In a setting head of the character described, the combination with a rotatable shaft, a member arranged for rotation about the axis of rotation of said shaft and provided with a plurality of spaced openings, means for holding said member against rotation, a second member fixed for rotation with said shaft and arranged adjacent to said first-mentioned member, and a pin adapted for insertion into said openings, said second member being adapted to coact with said pin whereby relative rotary movement of said members with respect to each other is limited in accordance with the selected opening into which said pin is inserted, of means for varying the relative position of said pin and said second member whereby rotary movement of said members with respect to each other may be limited to fractions of the space between adjacent openings in said first-mentioned member, said last-mentioned means comprising an adjustable dial loosely arranged on said shaft and shiftable longitudinally of the latter into and out of interlocking relation with said second member, said dial and said first-mentioned member being provided with means for limiting relative rotary movement of the same with respect to each other in one direction.

4. In a setting head of the character described, a rotatable shaft, a member releasably fixed against rotation with respect to said shaft, a second member fixed to said shaft, and a dial adjustable with respect to said second member, said dial being adapted and arranged for coaction with said first-mentioned member to limit movement of the latter with respect to the dial in one direction, and means associated with said members for limiting movement of the same predetermined amounts with respect to each other in a direction opposite to said direction.

5. In a setting head of the character described, a rotatable shaft, a member releasably fixed against rotation with respect to said shaft, a second member fixed to said shaft, and a dial adjustable with respect to said second member and loosely arranged upon said shaft for movement along the latter into and out of interlocking relation with said second member, said dial being adapted and arranged for coaction with said first-mentioned member to limit movement of the latter with respect to the dial in one direction, and means associated with said members for limiting movement of the same predetermined amounts with respect to each other in a direction opposite to said direction.

6. In a setting head of the character described, a rotatable shaft, a member releasably fixed against rotation with respect to said shaft and provided with a pin, a second member fixed to said shaft and provided with a slot, a dial adjustable with respect to said second member and provided with a lug arranged for movement in said slot and for engagement with said pin to limit relative movement of said dial and said first-mentioned member with respect to each other in one direction, and means associated with said members for limiting relative movement of the same predetermined amounts with respect to each other in a direction opposite to said direction.

7. In a setting head of the character described, a pedestal, a member comprising a flange having a hub fitted loosely into one end of said pedestal, means clamping said end of said pedestal about said hub to hold said member against rotation, a rotatable shaft arranged in said pedestal and extending loosely through said hub, a second member fixed for rotation with said shaft and having a flange superimposed upon said first-mentioned flange, said flanges being provided with adjustable means for limiting relative movement of said members predetermined amounts with respect to each other in one direction, and adjustable means associated with said members for limiting relative movement of the latter with respect to each other in the opposite direction.

8. In a setting head of the character described, a pedestal, a member comprising a flange having a hub fitted loosely into one end of said pedestal, means clamping said end of said pedestal about said hub to hold said member against rotation, a rotatable shaft arranged in said pedestal and extending loosely through said hub, a second member fixed for rotation with said shaft and having a flange superimposed upon said first-mentioned flange, said flanges being provided with adjustable means for limiting relative movement of said members predetermined amounts with respect to each other in one direction, and adjustable means associated with said members for limiting relative movement of the latter with respect to each other in the opposite direction, said last-mentioned means including a dial shiftable longitudinally along said shaft into and out of interlocking relation with said second member.

9. In a setting head of the character described, a rotatable shaft, a member supported for rotation about the axis of rotation of said shaft and provided with a stop, means for holding said member against rotation, a second member fixed for rotation with said shaft, a third member adjustable with respect to said second member and adapted to coact with said stop to limit relative rotary movement of said second member with respect to said first-mentioned member in one direction, and adjustable means associated with said first-mentioned and said second members for limiting relative rotary movement of the same with respect to each other in the opposite direction.

In witness whereof I hereto affix my signature.

CHARLES W. ALBRECHT.